United States Patent [19]
Corey et al.

[11] Patent Number: 5,218,627
[45] Date of Patent: Jun. 8, 1993

[54] DECENTRALIZED VIDEO TELECOMMUNICATION SYSTEM

[75] Inventors: Douglas A. Corey, Boulder; Jill E. Schmidt, Englewood, both of Colo.

[73] Assignee: U S West Advanced Technologies, Boulder, Colo.

[21] Appl. No.: 630,035

[22] Filed: Dec. 19, 1990

[51] Int. Cl.$^5$ .......................................... H04M 11/00
[52] U.S. Cl. ...................................... 379/53; 379/102; 379/202; 358/85; 358/125; 358/210
[58] Field of Search ...................... 379/53, 54, 94, 102, 379/104, 105, 202, 205; 358/85, 86, 125, 126, 210

[56] References Cited

U.S. PATENT DOCUMENTS

| | | | |
|---|---|---|---|
| 4,258,387 | 3/1981 | Lemelson et al. | 379/53 |
| 4,888,795 | 12/1989 | Ando et al. | 379/53 |
| 4,949,181 | 8/1990 | Elberbaum | 358/210 |
| 4,995,071 | 2/1991 | Weber et al. | 379/53 |
| 4,996,592 | 2/1991 | Yoshida | 379/202 |
| 5,008,924 | 4/1991 | Guichard et al. | 379/53 |

*Primary Examiner*—James L. Dwyer
*Assistant Examiner*—Wing F. Chan
*Attorney, Agent, or Firm*—Timothy R. Schulte

[57] ABSTRACT

Provided is a method and apparatus for the decentralized control of respective video cameras at a plurality of subscriber stations. According to the invention, there is provided a telephone, video camera, input device and camera control module at each subscriber station. The camera control module includes the input device and has a communication section for providing intelligence to the system, a control section for controlling respective video cameras, and a user feedback section to identify a respective camera, its station and a camera function being controlled.

25 Claims, 7 Drawing Sheets

DECENTRALIZED VIDEO TELECOMMUNICATION SYSTEM

TECHNICAL FIELD

This invention relates to telecommunication systems, and more particularly, to a multiple subscriber telecommunication system wherein the control of a network of video cameras is distributed to selected subscribers.

BACKGROUND ART

In teleconferencing, conference participants are brought together via a communication link for the purpose of information exchange. The "tele" prefix to the word telecommunications implies that one or more of the participants is remotely located from the other participants in the conference. Teleconferencing is a function which has been performed using prior art techniques and apparatus to give the perception that there is no distance barrier between participants who may actually be widely separated.

In view of the inherent limitations of audio teleconferencing, there developed numerous prior art methods and apparatus to add a video dimension to the teleconferencing function. However, each of these approaches has provided for the centralized control of respective video cameras or has placed control in the hands of the calling party alone.

In the former approach, all of the intelligence in a video teleconferencing system was placed in a central facility or central computing area in close proximity to the subscribers and control signals were distributed over thick cables to each of the stations. In view of the nature of these signals, low voltage A/C and D/C power, the length of the cables was limited to a few hundred feet. These prior art systems required individual wires between each of the cameras and a centralized switch for every camera control function (right, left, up, down, focus, zoom and iris). For short runs and few cameras, this was a reasonable solution, but for many cameras and longer runs, the cost for cable and installation became unreasonable. Moreover, subscriber stations which were not located within the distance limits imposed by the factors above, could not be included in a video teleconferencing scheme.

In the latter design, centralized control was placed in the hands of a conference leader who could effect the functions necessary to carry on a teleconferencing scenario and select locally generated images for transmission to a remote site so as to give the remote participants the perception of no distance barrier between themselves and other remotely located sites. However, in this latter design, the picture view was dependent upon the skill and operation of the conference leader. Remote subscribers had no control over the view that they received.

For a review of past approaches to video teleconferencing, see "THE GLOBAL VIDEO CONFERENCE" by Mokhoff appearing in IEEE Spectrum, September, 1980, pp. 44-47. See also, U.S. Pat. No. 4,516,156 issued to Fabris et al. on May 7, 1985 entitled "TELECONFERENCING METHOD AND SYSTEM"; U.S. Pat. No. 3,636,265 issued to Kikuchi et al. on Jan. 18, 1972 entitled "TELEVISION CONFERENCE TELEPHONE SYSTEM"; and U.S. Pat. No. 4,264,928 issued to Schober on Apr. 28, 1981 entitled "CONFERENCE VIDEO SYSTEM".

U.S. Pat. No. 4,516,156 issued to Fabris discloses a video teleconferencing method and system which is adapted to be connected by a wide band digital communication link, such as a domestic satellite communication system or a microwave communication system and further including at least a pair of teleconferencing sites, remotely located from each other. According to Fabris, each of the teleconferencing sites further includes at least a pair of TV cameras, readily controllable by the conference leader in terms of pan, tilt, zoom and focus, so that a video image can be transmitted from one site to another. Fabris further discloses the use of at least a pair of video displays under the control of the conference leader, allowing the conference leader to select the image that will be portrayed on each display from at least among a remotely generated video image and a locally-generated video image.

U.S. Pat. No. 3,636,265 issued to Kakuchi et al., discloses a television conference telephone system comprising a plurality of terminal equipments adapted to transmit and receive audio signals and video signals, means to connect to the conference telephone system terminal equipments of subscribers attending the conference, selector means corresponding to said plurality of terminal equipments, control logic means operating only the selector means corresponding to the terminal equipment of a particular subscriber attending the conference, and a video signal distributing means which is responsive to the selector means to supply the video signal of only a particular subscriber to television receivers of terminal equipments of all subscribers attending the conference. Kakuchi's system further provides for the ability of a talking subscriber or attendant to monitor its own condition and ascertain whether the presented charts or data and the like are properly displayed and transmitted.

U.S. Pat. No. 4,264,928 issued to Schober discloses a conference video system including a plurality of conference seats and microphones, a TV camera and a pivotable mirror which directs light from the conference seats to the TV camera. As disclosed by Schober, each of the microphones is coupled through circuit elements to a servomotor(s) which positions the mirror to focus on the speaker and aims the camera's field of vision toward active audio. The electronic portion of the system utilizes the time, two adjacent microphones receive a speaker's voice to generate a signal used to drive the servomotor to perform its mirror-positioning function.

DISCLOSURE OF THE INVENTION

In accordance with the present invention, the telecommunication system operates as follows:

(1) A video telephone call is originated on a first channel operable through a commercially available telephone subscriber station. Both the audio and the video components of the teleconference are established.

(2) A second channel such as a telephone channel or data channel is thereafter activated as a normal part of a video telephone call to link the camera control modules local to each subscriber station and establish a data connection. The second channel accepts input and effects commands in accordance with the input;

(3) Thereafter, local or remote cameras and their functions are selected from an input local to each of the subscriber stations and the desired functions are communicated to the camera selected.

Accordingly, it is an object of the present invention to overcome the limitations imposed by the prior art central camera control systems. Namely, it is an object of the invention to provide a multiple subscriber telecommunication system that operates without a central computing station and therefore, without the use of hard wiring from each camera to a centralized switch.

It is a further object of the present invention to provide a multiple subscriber telecommunication system that places control of the called party's camera in the hands of the calling party.

In carrying out the above object, the present invention is therefore directed generally to a telecommunication system and method of distributing control of a network of cameras in a multiple subscriber telecommunication system to selected subscriber stations.

Within the framework of this general direction, there is further provided means for selecting stations to be driven by a camera control module (CCM), asserting a display in the user feedback section of the CCM and communicating as necessary the input of an input device to the camera to be controlled.

A specific object of applicant's invention is to provide a telephone, video camera, input device, and camera control module at each station. The camera control module includes the input device and has a communication section for providing intelligence to the system, a control section adapted for external power supply for controlling a respective video camera and a user feedback section to identify a respective camera, its station, and a camera function being controlled.

The objects, features, and advantages of the present invention are readily apparent from the following detailed description of the best mode for carrying out the invention when taken in connection with the accompanying drawings.

BRIEF DESCRIPTION OF THE DRAWINGS

The present invention can be more completely understood by reference to the accompanying drawings in which.

BEST MODE FOR CARRYING OUT THE INVENTION

Figure 1:
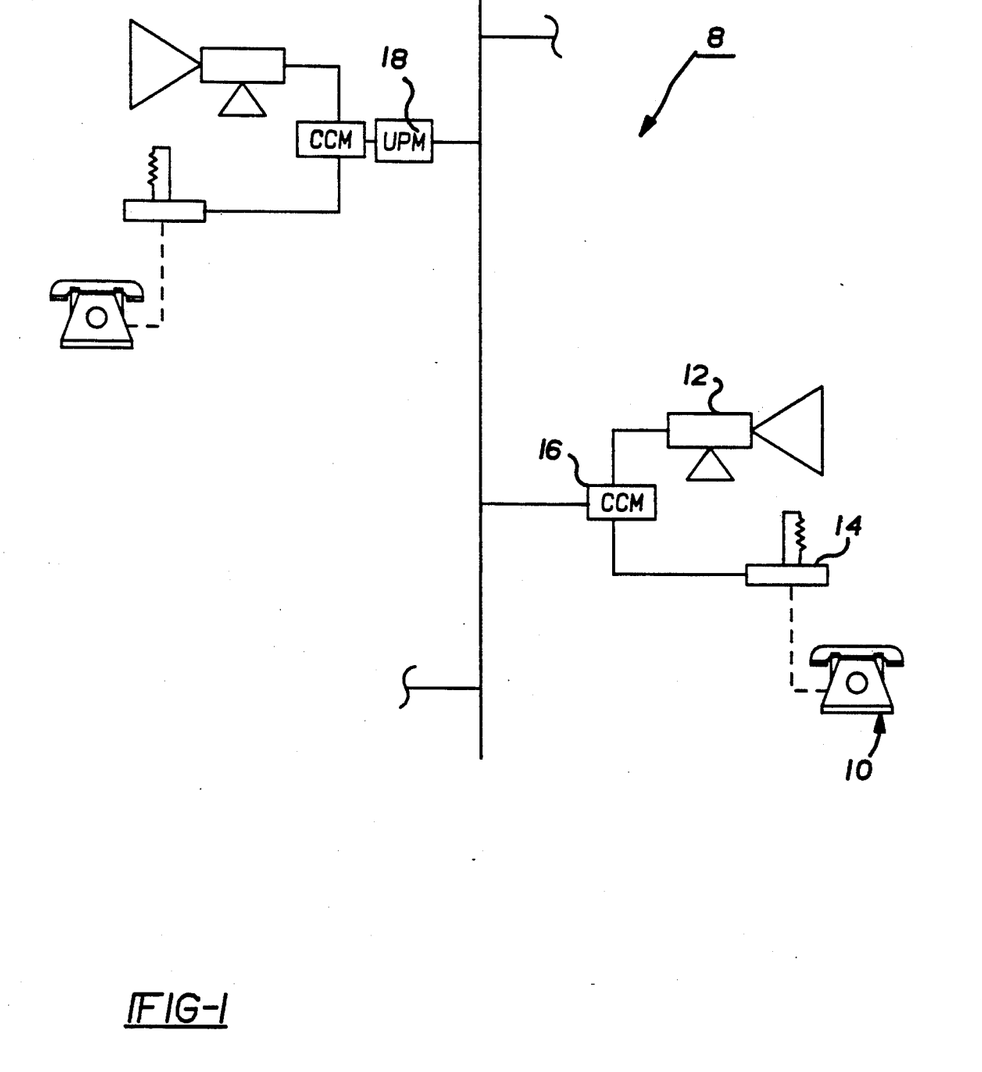
FIG. 1 is a schematic view of the telecommunications system of the invention incorporating a camera control module (CCM) and illustrating the interaction or cooperation between the various components of the system.

According to the invention described herein, there is provided a network of cameras in a multiple subscriber telecommunications system 8. With reference to FIG. 1, each subscriber station in the system is provided with a telephone 10, a camera 12 having a pan/tilt unit 13, an input device 14 such as a joystick, and a camera control module 16.

In a preferred embodiment, one of said subscriber stations is further provided with a user process module (UPM) 18 for use in a contemporaneous multistation conference such as a video classroom. In ordinary operations, i.e. two station conferences, there is no need for a user process module since dedicated routing would exist between the respective camera control modules of the activated stations. However, in the case where multiple subscriber stations, i.e. more than two stations, are operating contemporaneously, there is a need for a user process module 18 to properly route the respective signals to and from the selected stations.

According to the invention, the user process module is provided for selecting stations to be driven by the camera control module, asserting a display in the user feedback section of the CCM and communicating the necessary input from the input device 14 to the cameras to be controlled. While it is contemplated that the user process module will comprise software, the module may, within the skill of the art, be designed to carry out the same functions in hardware form.

Figure 2:
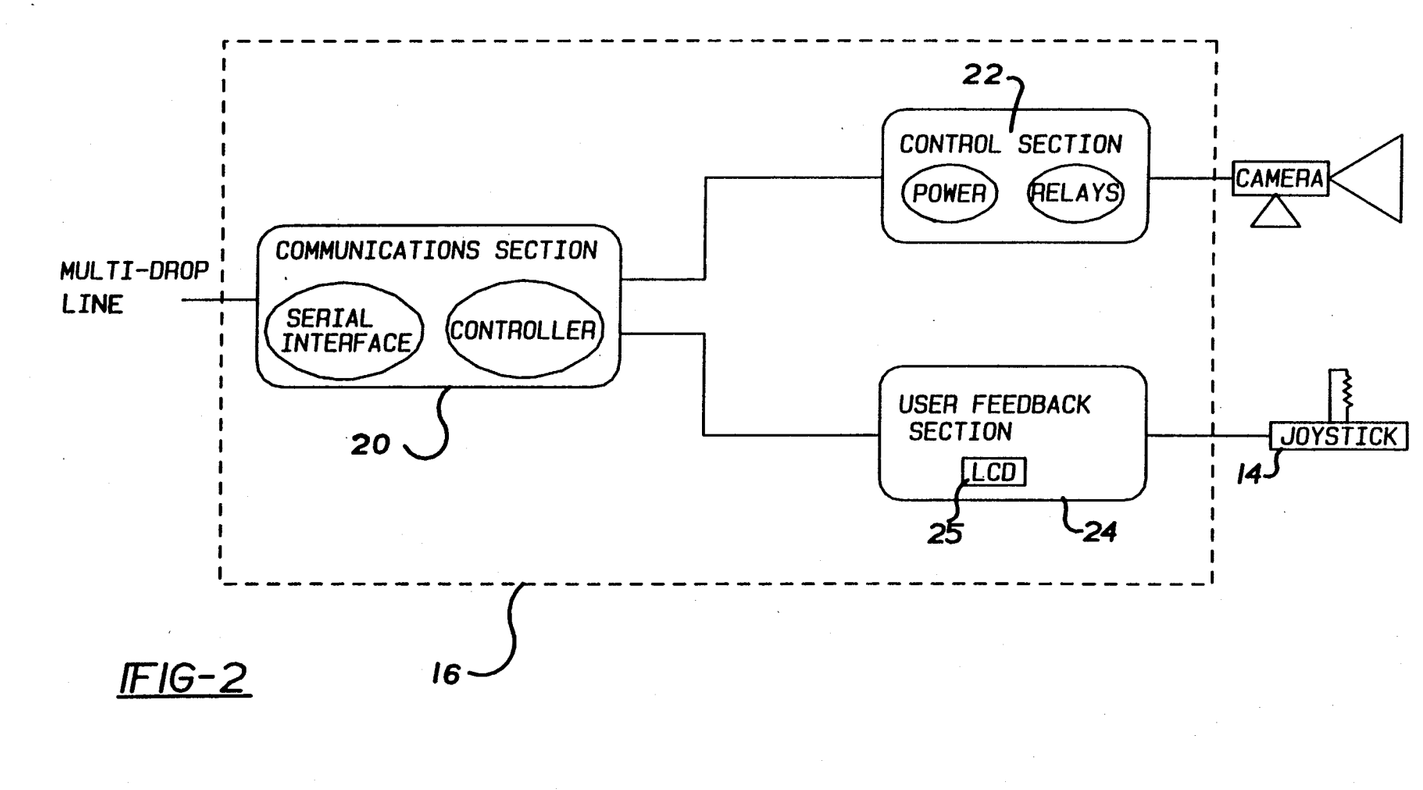
FIG. 2 is a schematic view of the camera control module broken into block diagrams to show its communications section, control section and user feedback section.

Referring now to FIG. 2, the camera control module contains a communications section 20 for providing intelligence to the system, a control section 22 adapted for external power supply for controlling a respective video camera, and a user feedback section 24 to identify a respective camera, its station, and a camera function of the camera being controlled.

Referring again to FIG. 1, the user process module 18 is operable for selecting a pair of stations to be driven by the control section 22, asserting a display in the user feedback section 24 and communicating as necessary the input of the input device 14 to the camera to be controlled.

As set forth above, the camera control module communication section 20 includes the intelligence for the system along with its necessary peripherals. The user feedback section 24 cooperates with the user input device 14 to provide a feedback of the input through a liquid crystal display (LCD) 25.

The respective communications, user feedback and control sections of the camera control module of the invention will be more thoroughly explained below.

THE COMMUNICATIONS SECTION

Figure 3:
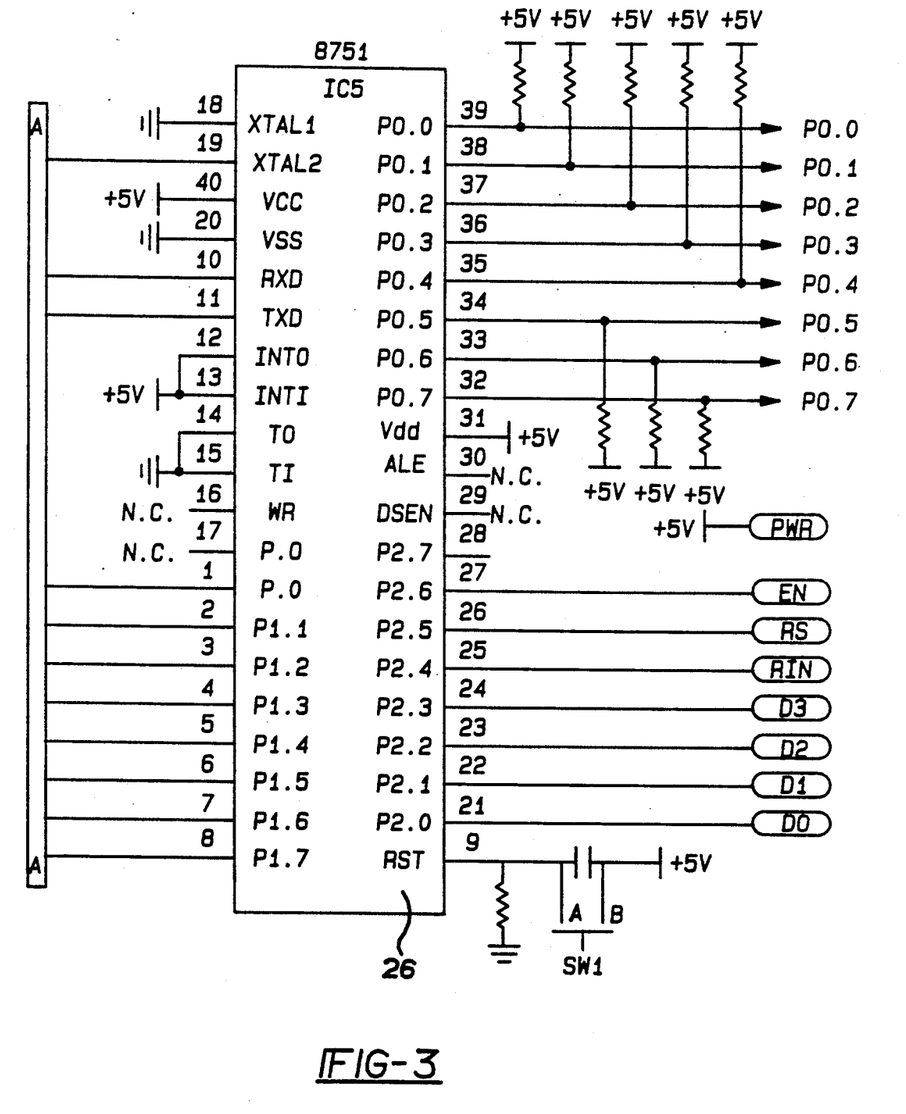
FIGS. 3 and 4 are schematic circuit diagrams of the camera control processor or controller portion of the communications section of the camera control module of the invention shown in FIG. 2.
Figure 4:
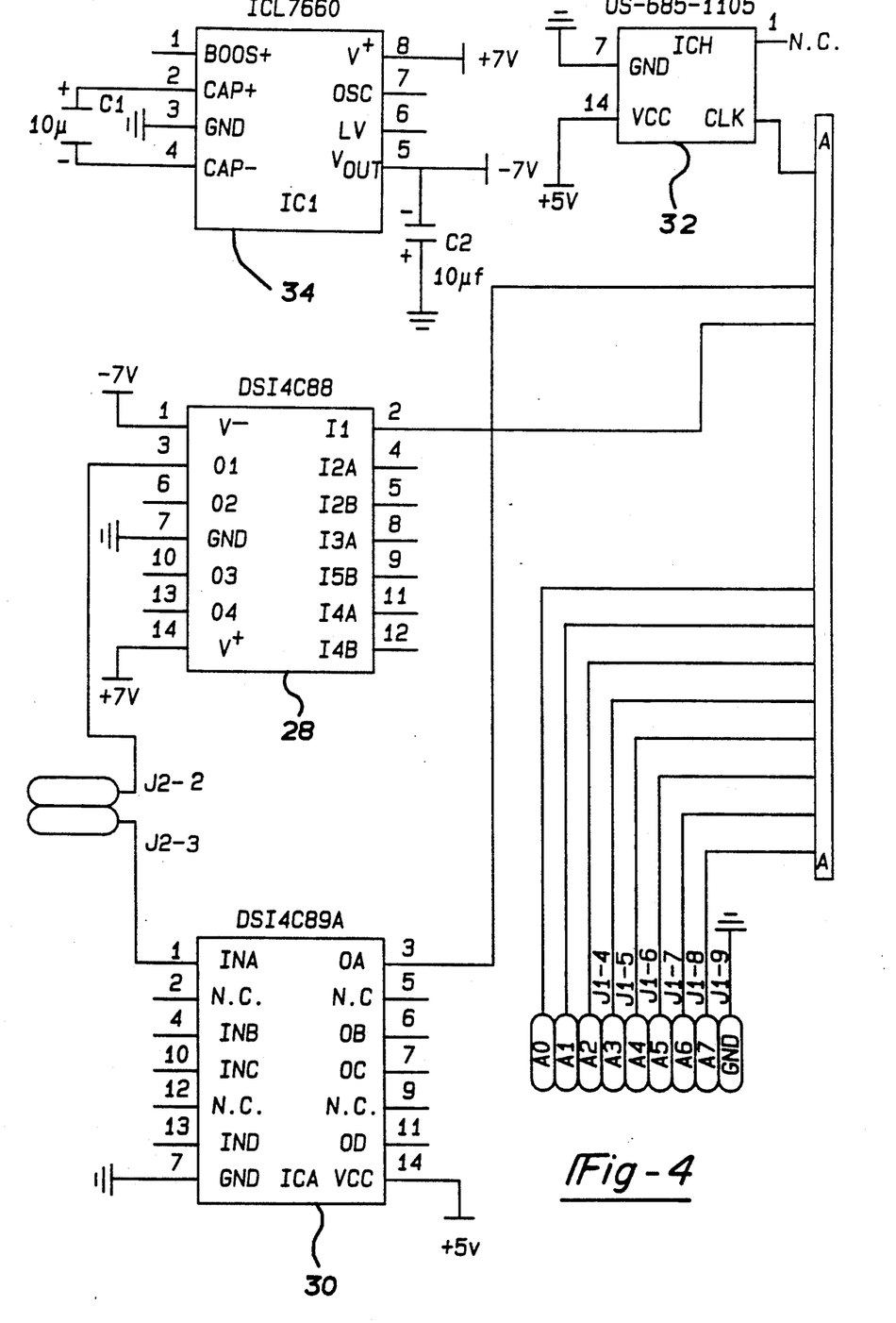

As shown in FIGS. 3 and 4, the communication section of the camera control module of the invention preferably contains an Intel 8751 single chip microcontroller 26. This chip contains most of the required functions including timers, EPROM, RAM, and a Universal A synchronous Receiver Transmitter (UART). However, additional chips are needed such as serial line driver 28, receiver 30, oscillator 32, and a power inverter 34. The line driver 28, and receiver 30 are used to interface the TTL level signals within the camera control module with the serial line voltages. The chips used are preferably national semiconductor CMOS parts (DS 14C88 and DS 14C89A) because the CMOS versions operate at the lower voltages of +/−7 VDC. The oscillator 32 is preferably a US crystal 11.059 MHz crystal clock oscillator and provides a TTL level clock to the microcontroller 26 for use as the main clocking source.

The camera control module 16 is supplied with +5 VDC, +7 VDC, and ground for the camera at each station. These voltages are conveniently supplied by the station cameras. However, in a more general case, a power supply might be needed to supply these or similar voltages to the camera control module. In operation, the +7 V power source is inverted using a power invertor 34 such as an ICL 7661 chip in order to supply the necessary −7 V to the line drivers 28.

THE USER FEEDBACK SECTION

Figure 6:
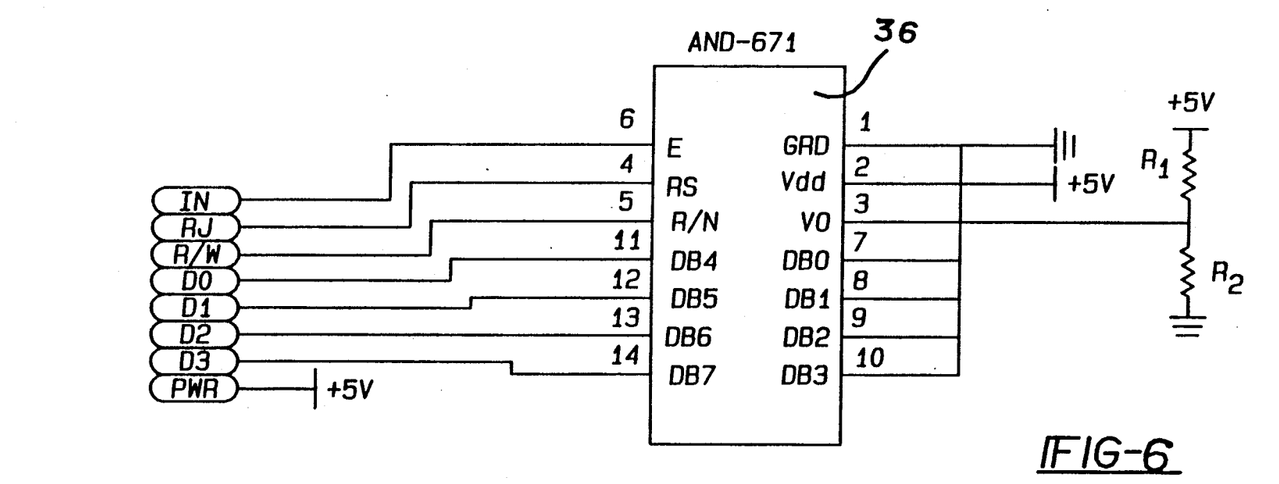
FIG. 6 is a schematic circuit diagram of the camera control input device for the user feedback section of the camera control module of the invention shown in FIG. 2.

With reference to FIGS. 2 and 6, the user feedback section 24 of the camera control module of the present invention includes an AND chip 36 and preferably an AND-671 having a one line by sixteen character display, directly connected to port zero of the microcontroller 26. The AND chip 36 is powered with a five volt power supply to display which camera the camera control module 16 is controlling, by indicating the name of the station, and the current command being executed.

THE CONTROL SECTION

Figure 5:
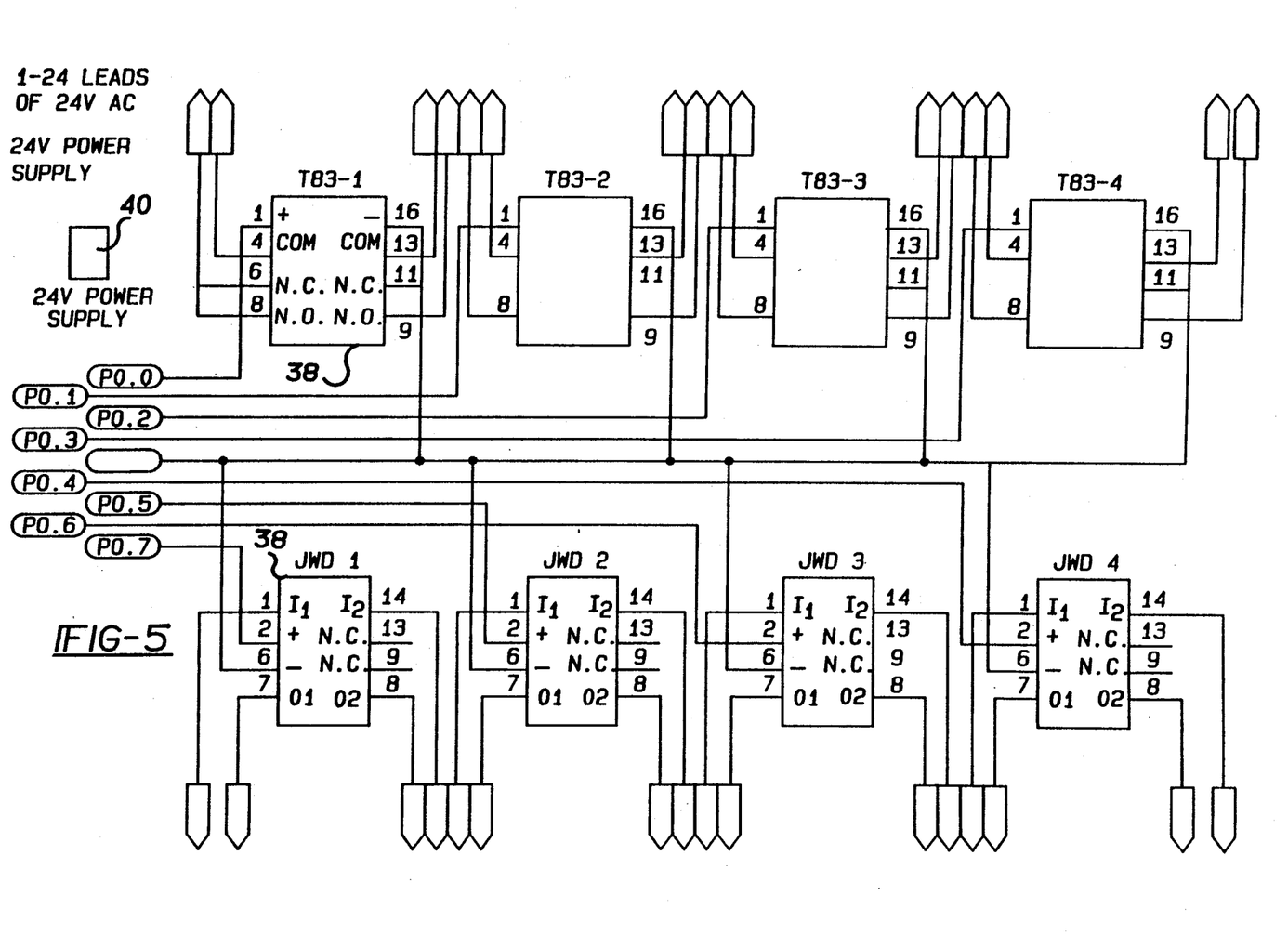
FIG. 5 is a schematic circuit diagram of the camera control relay or relays portion of the control section of the camera control module of FIG. 2.

As shown in FIG. 5, this section contains a number of switching relays 38 necessary for control of the camera control module. Because different camera functions have a variety of control requirements, the relays may be configured to correspond to each such function.

In the case of pan/tilt movement of the cameras, switching relays 38 are serially interfaced with the microcontroller 26 to obtain the proper directional movement. In operation, 24 VAC is switched across the terminals of the relays 38 (preferably, Potter and Brumfield T83S11D212-05, double-pole, double-throw, non-latching relays) to control the proper movement.

Similarly, the focus is controlled by switching 3 VDC directly across the focus motor. Reversing voltage polarity reverses focus direction. The relays used are preferably Potter and Brumfield JWD-171-25, double-pole, single-throw, normally opened relays. When the relays 38 are energized, 3 VDC is switched to connect across the focus motor. Otherwise, no connection is made across the focus motor. By using two relays and reversing the polarity of the 3 VDC, both focus directions can be controlled. It is recognized by applicant that this approach to focus control may result in inferior results if the camera is left on auto-focus. In that case, the camera and the control module 16 may actually be applying opposite voltages across the focus motor, causing damage to the motor. Thus, it is preferable to have cameras without auto-focus or to set those with auto-focus to the manual setting.

The zoom is controlled by connecting a zoom-in or zoom-out wire local to the subscriber station cameras to a common wire. When a connection is made between the common and zoom-in wires, the camera will zoom-in. Again, JWD-171-25 relays are preferably used.

Also included in this section is a 24 VAC power supply 40 to provide the proper pan/tilt voltage levels. The camera voltage levels are derivable from the +5 V power supply from the camera. Connectors for the appropriate camera and the pan/tilt unit connections are also supplied in this section.

It should be understood that the functional features of the camera control module herein may be performed, using the teachings of this invention, by a commercially available personal computer and keyboard with appropriate software. It is further contemplated that touch sensitive screens or external input devices such as "mouse" devices may be used by a subscriber to originate a telephone call and/or control the respective cameras.

Still further, it is contemplated that a mixture of the above devices may be used in conjunction with each other to achieve the desired results of applicant's telecommunication system.

OPERATION

Figure 7:
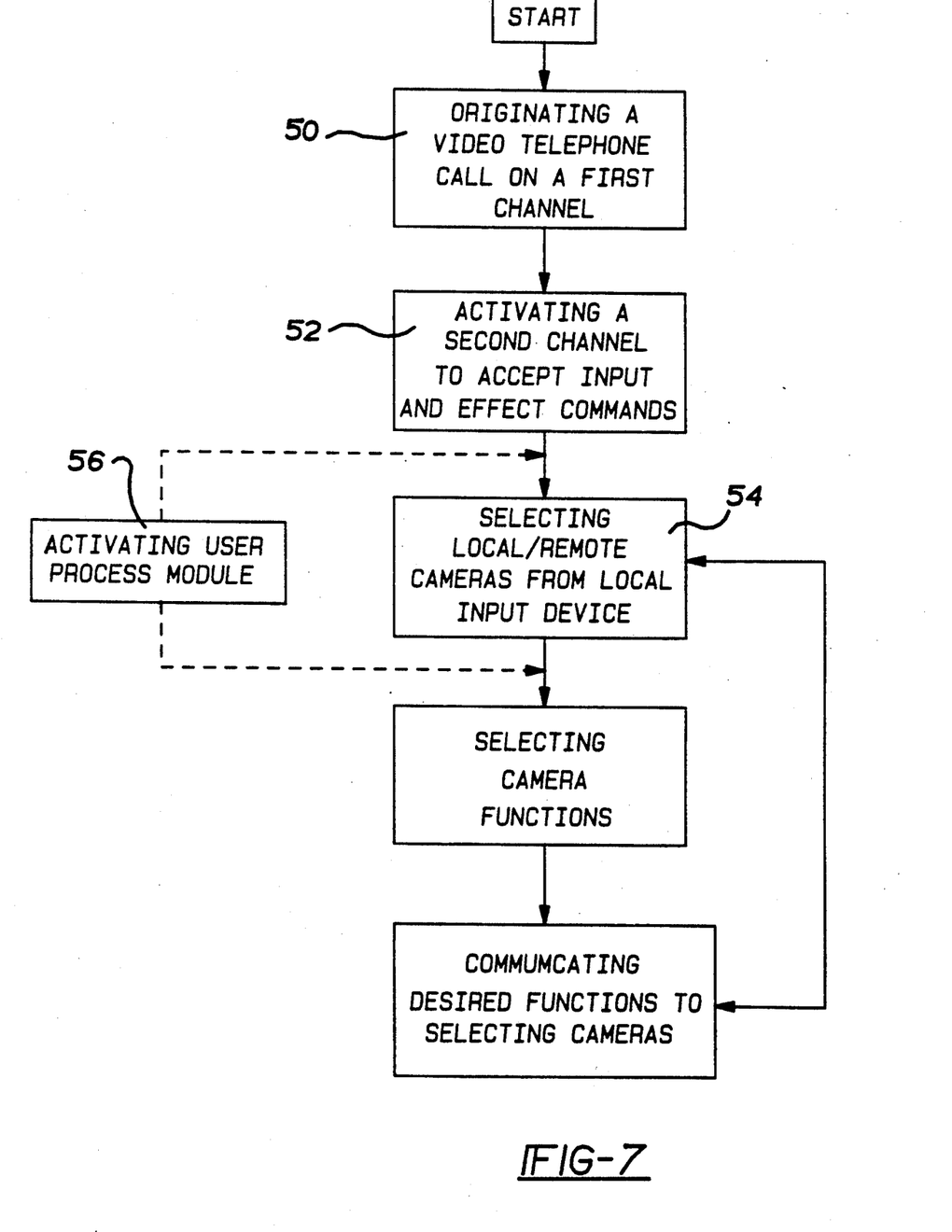
FIG. 7 is a flow chart illustrating the steps in a method for using the telecommunication system of the invention.

Referring now to FIG. 7, the operation of applicant's telecommunication system will be described. At the outset, a video telephone call is originated on a first channel 50, preferably a commercially available telephone transmission line from a subscriber station. A call may similarly be originated over a data channel as well. Thereafter, a second channel 52, preferably the "D" channel of an ISDN (Integrated Services Digital Network) transmission system is activated as a normal part of the video telephone call to accept input from the subscriber station and effect a command therefrom in accordance with the input device. In the case where a call is originated over a telephone transmission line, the audio component of the teleconference is also carried over the origination line. However, the video component of the teleconference is always carried over a different channel regardless of the manner of origination. For example, in an ISDN network, the video component may be carried over the "B" channel. Similarly, the video component may be carried over a broad band ISDN network or a $T_1$ or $T_3$ transmission line.

As set forth above, the input device is preferably a joystick but may be a keyboard, touch sensitive screen or similar device. Thereafter, local or remote cameras are selected from input devices local to the user 54. The user then selects through the second channel camera functions 58 and communicates the desired functions to the camera selected 60.

In the case of contemporaneous multiple subscriber conferences, a user process module (UPM) local to one of the subscriber stations is activated (56) to select and display other subscriber stations which are to be driven and communicate the necessary input from the input of the input device to the cameras to be controlled.

While the best modes for carrying out the invention have been described in detail, those familiar with the art to which this invention relates will recognize alternative designs and embodiments for practicing the invention as defined by the following claims.

What is claimed is:

1. A telecommunication system providing for the decentralized control of respective video cameras at a plurality of subscriber stations, said system comprising:
   a telephone, video camera and input device at each subscriber station; and
   a camera control module at each subscriber station for controlling cameras at different subscriber stations, said camera control module including said input device and having a communications section providing intelligence for the system, a control section adapted for external power supply for electromagnetically controlling a respective video camera, and a user feedback section to identify a respective camera, its station, and a camera function being controlled.

2. A telecommunication system as in claim 1, further comprising means for selecting stations to be driven by said control module, asserting a display in said user feedback section of said subscriber station, and communicating as necessary the input of said input device to the cameras to be controlled.

3. A telecommunications system as in claim 1, wherein said camera control module communication section includes a single chip microcontroller having EPROM, RAM and Universal Asynchronous Receiver Transmitter (UART) functions for providing said intelligence.

4. A telecommunications system as in claim 3, wherein said camera control module communication section further includes a line driver chip serially interfaced with said microcontroller.

5. A telecommunications system as in claim 3, wherein said camera control module communication section further includes a receiver chip serially interfaced with said microcontroller.

6. A telecommunications system as in claim 3, wherein said camera control module communication section further includes an oscillator serially interfaced with said microcontroller.

7. A telecommunications system as in claim 4, wherein said camera control module communication section further includes a power invertor chip serially interfaced with said line driver.

8. A telecommunications system as in claim 1, wherein said camera control module user feedback section includes a character display chip serially interfaced with said microcontroller to display the selected station and camera the camera control module is controlling and the function of the camera being controlled.

9. A telecommunications system as in claim 1, wherein said camera control module control section includes a first plurality of switching relays serially interfaced to said microcontroller for controlling the proper pan/tilt movement of said respective camera.

10. A telecommunications system as in claim 3, wherein said camera control module control section includes a second plurality of switching relays serially interfaced to said microcontroller for controlling the proper focus of said respective camera.

11. A telecommunications system as in claim 3, wherein said camera control module control section includes a third plurality of switching relays serially interfaced to said microcontroller for controlling the proper zoom of said respective camera.

12. A telecommunication system as in claim 1, wherein said camera control module comprises a commercially available personal computer and keyboard.

13. A decentralized camera control module for distributed control of a network of cameras in a multiple subscriber telecommunication system having a first channel for voice communication, comprising:
a second channel means operable through said module when activated as a normal part of said video telephone call through said first channel to accept input and effect a command in accordance with said input;
each said camera including an input section for selecting a camera at a subscriber station different from the location of said selecting input section;
a control section for selecting a function for the camera selected; and
a communication section for sending the selected function to the camera selected.

14. A decentralized camera control module as in claim 13, wherein said first channel means comprises a commercially available telephone transmission line.

15. A decentralized camera control module as in claim 13, wherein said second channel means comprises the "D" channel of an ISDN transmission system.

16. A decentralized camera control module as in claim 13, wherein said communication section includes a single chip microcontroller having EPROM, RAM and universal asynchronous receiver transmitter (UART) functions.

17. A decentralized camera control module as in claim 13, wherein said control section includes a first plurality of switching relays serially interfaced to said microcontroller for controlling the proper pan/tilt movement of said respective camera.

18. A decentralized camera control module as in claim 17, wherein said control section further includes a second plurality of switching relays serially interfaced to said microcontroller for controlling the proper focus of said respective camera.

19. A decentralized camera control module as in claim 18, wherein said control section further includes a third plurality of switching relays serially interfaced to said microcontroller for controlling the proper zoom of said respective camera.

20. A decentralized camera control module as in claim 16, wherein said communication section further includes a line driver chip serially interfaced with said microcontroller.

21. A decentralized camera control module as in claim 16, wherein said communication section further includes a receiver chip serially interfaced with said microcontroller.

22. A decentralized camera control module as in claim 16, wherein said communication section further includes an oscillator serially interfaced with said microcontroller.

23. A decentralized camera control module as in claim 20, wherein said communication section further includes a power invertor chip serially interfaced with said line driver.

24. A method of decentralizing control of a network of cameras in a multiple subscriber telecommunication system, comprising the steps of:
originating a video telephone call on a first channel means operable through a commercially available telephone subscriber station;
activating a second channel means separate from said first channel means as a normal part of a video telephone call on said first channel to accept input and effect a command in accordance with said input;
selecting, from a first subscriber station and through said second channel a camera at a subscriber station different from said first subscriber station, said step of selecting accomplished from an input device local to each of said cameras;
selecting through said second channel a function for the camera selected; and
communicating through said second channel the selected function to the camera selected.

25. A method of decentralizing control of a network of cameras in a multiple subscriber telecommunication system as in claim 24, including the further step of:
activating a user process module local to at least one of said subscriber stations to select and display other subscriber stations to be driven therefrom and communication as necessary the input of said input device to the cameras selected.

* * * * *